Patented Oct. 3, 1922.

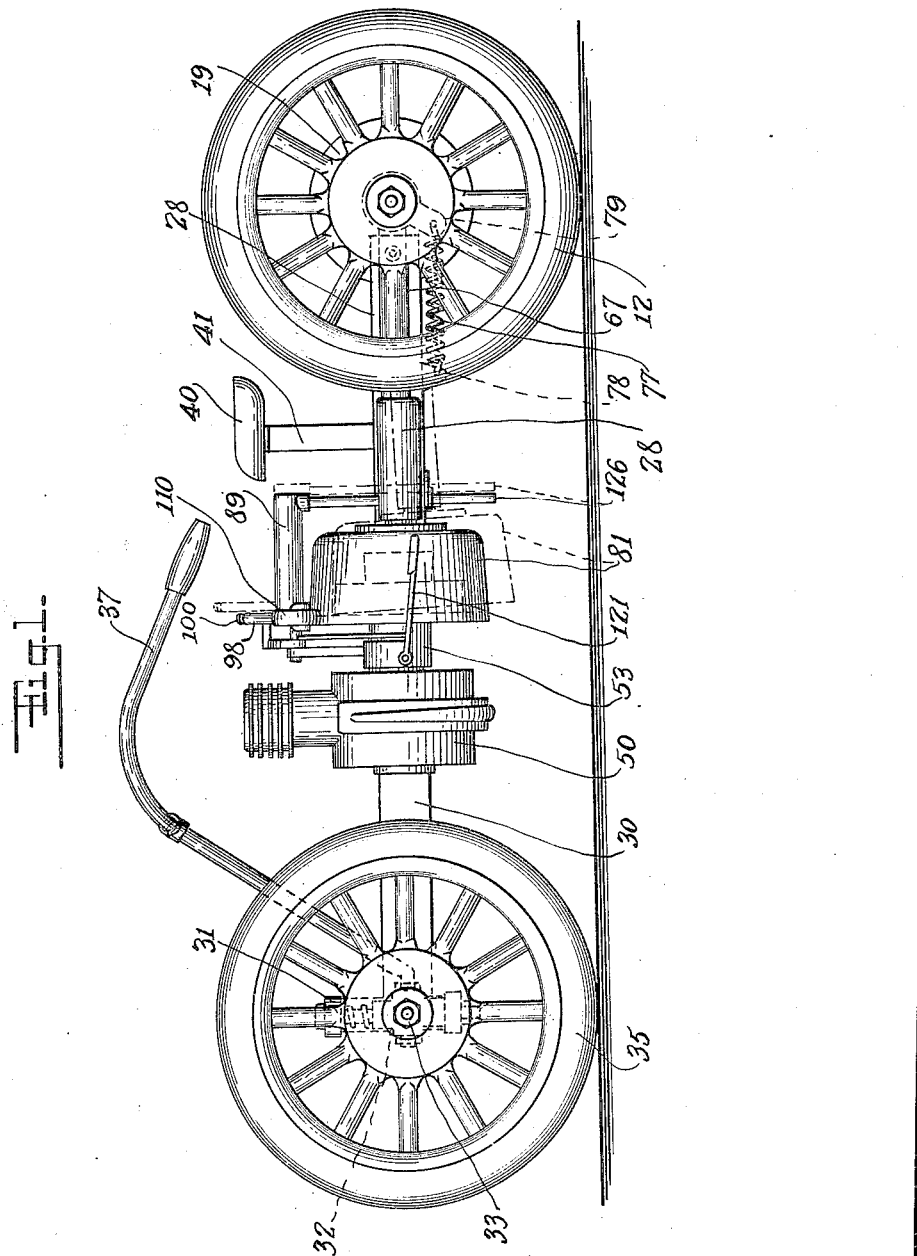

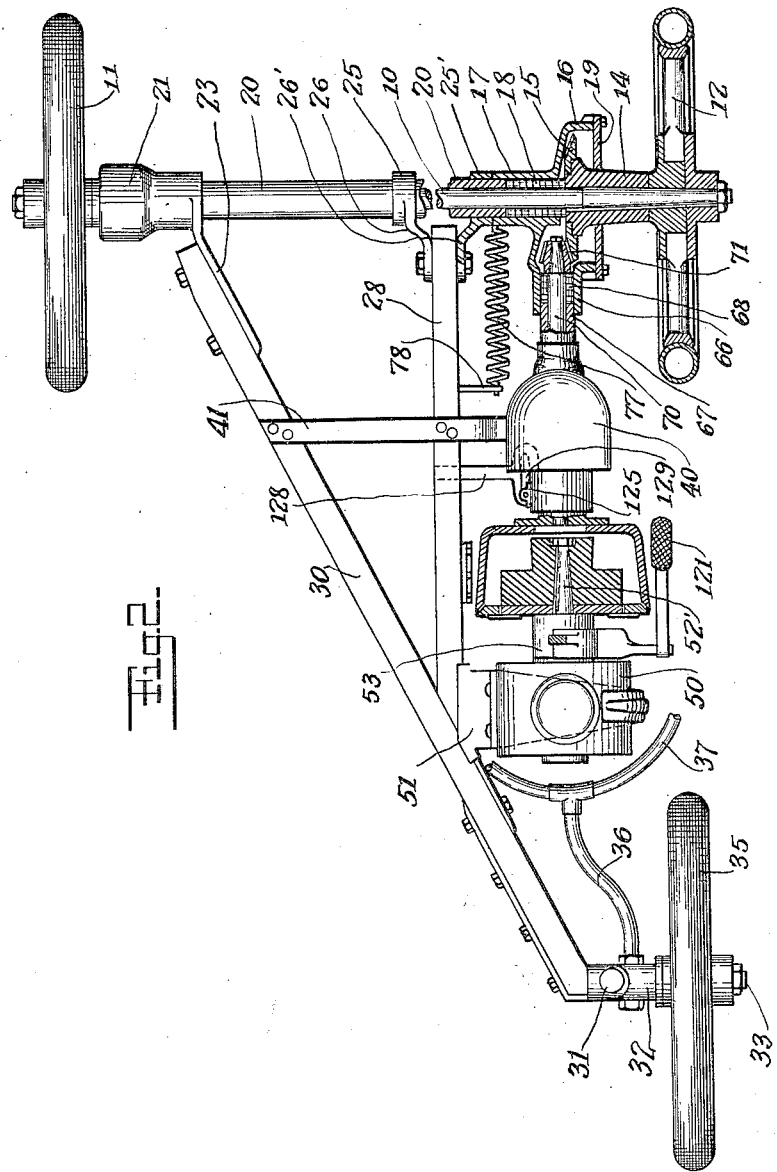

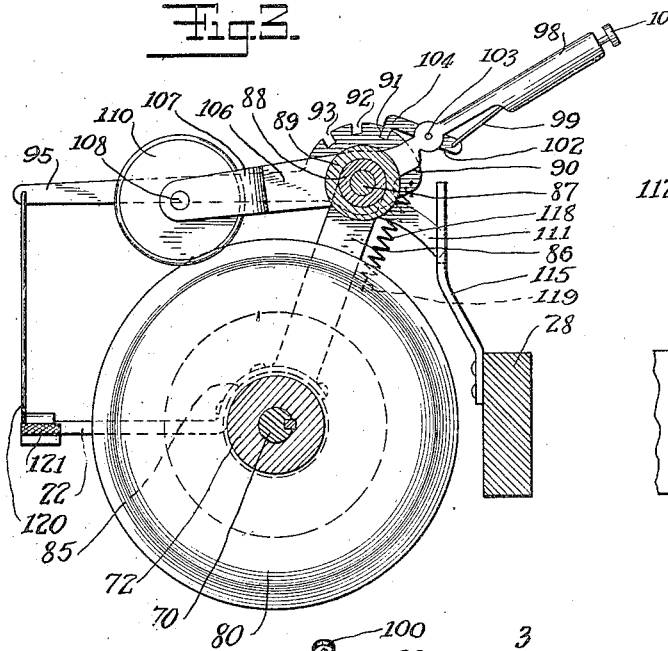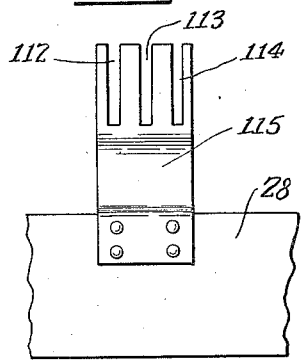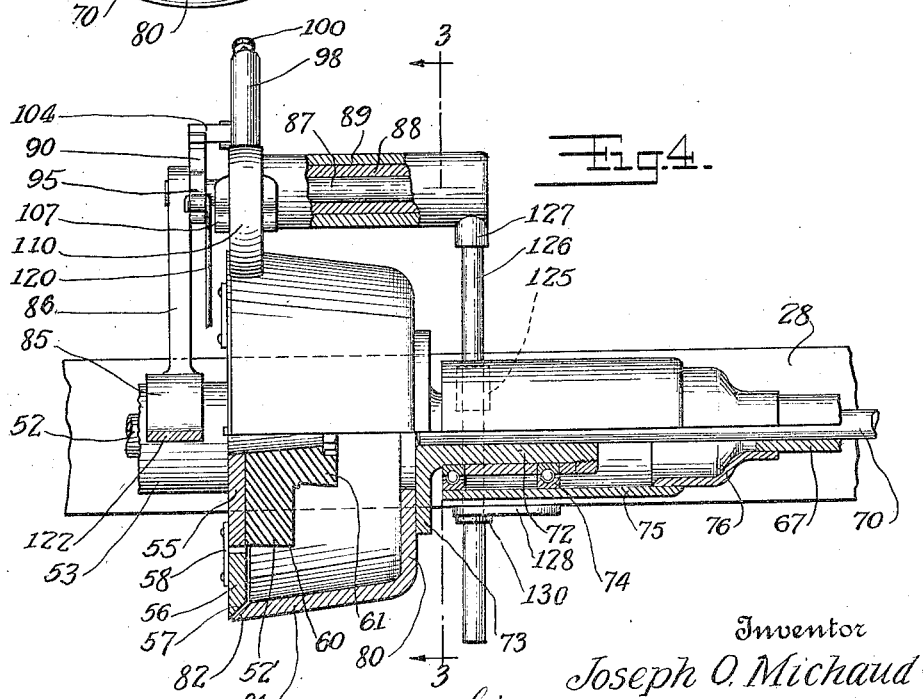

1,431,020

UNITED STATES PATENT OFFICE.

JOSEPH O. MICHAUD, OF FORT KENT, MAINE.

VEHICLE TRANSMISSION MECHANISM.

Application filed February 26, 1921. Serial No. 448,259.

*To all whom it may concern:*

Be it known that I, JOSEPH O. MICHAUD, a citizen of the United States, and a resident of Fort Kent, county of Aroostook, and State of Maine, have invented certain new and useful Improvements in Vehicle Transmission Mechanism, of which the following is a specification.

This invention has as its main object to provide a novel and practical power transmission device for motor operated vehicles whereby different ratios of speed are quickly and positively obtained.

A further purpose is to produce such means in a simple and compact form, relatively inexpensive to manufacture, durable in use, easy to operate and not readily liable to become disordered.

These and other like objects, which will become apparent as the description progresses, are attained by the novel construction, combination and arrangement of parts, hereinafter described and shown in the accompanying drawings, forming a material part of this disclosure and in which:—

Figure 1 is a side elevational view of a conventional type of vehicle having a transmission made in accordance with the invention and showing in broken lines the parts in the second or medium speed position.

Figure 2 is a top plan view of the same, parts being broken away to disclose the more essential features of the construction.

Figure 3 is an enlarged transverse sectional view taken in vertical plane near the base of the adjustable friction element on line 3—3 of Figure 4.

Figure 4 is a partial side elevational and partial longitudinal sectional view of the same, parts being broken away to show the interior elements.

Figure 5 is a front view of the operating lever positioning or comb plate.

Referring in general terms to the invention, here shown as applied to a conventional type of motor driven vehicle, known as motor tricycle, in which a pair of rear wheels are spaced in accordance with common practice and the front wheel arranged to track with one of the rear wheels and to be steered in the usual manner.

A substantially triangular frame is connected to the rear axle housing and has a horizontal pivoted spindle at its front end for the front wheel, the knuckle joint being operated by a forked handle bar extending rearward adjacent the seat.

An internal explosive motor is fixed to the frame, its shaft extending towards the rear axle at a right angle to it, and secured to the shaft is a stepped friction element by which different speeds are attained.

The drive shaft is geared to the axle or differential and its support is mounted upon it in such manner as to pivot, permitting the front end of the shaft to be raised or lowered.

Keyed to slide on the drive shaft, at its outer front end, is a cup-like friction element and means are provided by which the cup is shifted on the shaft and elevated or depressed to engage with any of the steps of the friction element carried by the motor.

Means are also provided to exert pressure on the friction element causing cohesion, and for locating the cup in connection with any desired step.

Referring now more particularly to the drawings, the numeral 10 designates the rear axle supported by wheels 11 and 12, the latter, together with a hub element 14, being keyed direct to the axle as shown.

The inner end of the hub 14 is fixed in a bevel gear 15 enveloped in a housing 16, having an extending sleeve 17, containing an anti-frictional bearing 18 encircling the axle 10, while the enlarged portion of the housing, adjacent the wheel 12, is provided with a removable cover plate 19.

A sleeve 20 surrounds the remainder of the axle and has at the end adjacent the wheel 11 other anti-friction bearings within the housing 21, from which an angularly disposed support arm 23 extends towards the front.

Fixed to the sleeve 20 are a pair of spaced collars 25 and 25′, the latter abutting the end of the sleeve 17, these collars having forwardly extending arms 26 and 26′, between which is bolted a frame bar 28 extending horizontally towards the front at a right angle to the axle, its forward end being firmly fixed to the inner surface of the main frame bar 30, securely bolted to the support arm 23 at one end while the forward end carries a bracket 31.

Mounted in this bracket is a knuckle joint element 32 from which outwardly extends a spindle 33 carrying the front wheel 35, the same being steered in the usual manner by a handle bar 36, its forks 37 extending rearwardly adjacent a seat 40 supported on a spring bar 41, carried by the frame elements 28 and 30.

A motor 50, is carried in a bracket 51, securely engaged to the frame bars at their intersection, its spindle 52 extending through a projection 53 towards the rear in a plane horizontal with and at a right angle to the axle 10.

The inner tapered end 52' of the motor spindle has fixed upon it a disc 55, circumjacent to which is a ring 56 having a bevelled outer edge 57, the ring being connected to the disc by a plurality of spring strips 58.

Disposed tightly against the disc 55 is the larger step 60 of friction element having a cylindrical surface and formed with a smaller step 61, the latter being slightly tapered for purposes further on apparent.

These stepped friction elements are preferably made of laminated plates of fibre, wood or the like, keyed to the motor spindle and held tight by a nut.

Formed with the gear housing 16 is an extension 66 bored to receive the end of a sleeve 67 and an anti-frictional sleeve 68 in which the transmission drive shaft 70 is journalled, this shaft having secured upon its end, extending into the housing 66, a bevel pinion 71 meshing with the gear 15 as best shown in Figure 2.

Keyed to the outer front end of the drive shaft in such manner as to slide longitudinally on it, is an elongated hub 72 having an annularly flanged head 73, this hub rotating in anti-friction bearings 74 held within a nonrotatable sleeve 75 having an adapter 76 at its rear end, slidably engaged over the sleeve 67 and being supported, guided and shifted by means later described.

The weight of the drive shaft and attached parts is counterbalanced by a compensating tension spring 77 attached at its ends respectively to a bracket 78 fixed to the frame bar 28 and a projection 79 extending down from the housing sleeve 17.

Fixed concentric with the flange 73 is the bottom or base 80, of a cup or drum element having a conically flaring annular wall 81 with a bevelled edge 82, adapted to make intimate operative contact with the correspondingly bevelled edge 57, of the drive ring carried by the motor when the shafts 52 and 70 are in alignment.

From the foregoing it will be understood that the mounting of the drive shaft 70 is such as to permit it, together with its attached parts, to pivot on the axle, thus allowing the cup to be raised or lowered with reference to the friction elements and also that the cup can be shifted to bring the bevelled edges into engagement, or the interior surface of the cup into frictional engagement with the steps 60 or 61, thereby reducing the speed transmitted to the drive shaft, while the faces of these steps are suited to engage in various positions, the second speed position being indicated in broken lines in Figure 1.

Vertical and longitudinal adjustment of the cup or drum is accomplished in the following manner.

Rigidly attached to the motor casing projection 53, is a bracket 85 having an approximately vertical arm 86 carrying at its end a fixed spindle 87 extending rearwardly over the cup at some distance above it.

On this spindle is mounted a sleeve 88 and exterior slidable jacket 89.

Pivoted on the spindle 87, adjacent the arm 86, is a segment 90 having a series of notches 91, 92 and 93 in its face and an extending lever arm 95 for a purpose further on described.

Attached to the adjacent end of the sleeve 88 is a hand lever 98 containing a rod 99 having a knob 100 by which the rod may be depressed, the lower end of this rod engaging one end of a pawl 102 and having an offset projecting catch 104 engageable in any of the notches 91, 92 and 93.

Extending from the hub of the hand lever element 106 are forks 107, between which on a pin 108, is rotatably mounted a tension roller 110 adapted to make contact with the cup near its edge, the roller and cup shifting in unison, the movement being determined by a projecting arm 111 adapted to engage in the spaces 112, 113 or 114 of a comb element 115 fixed upon the frame bar 28, the arm 111 being integral with the lever 98, 106.

A counterbalancing tension spring 118, extending between the segment opposite the lever arm 95, and pin 119, set in the edge of the arm 86, serves to normally maintain the lever 95 in a raised position.

At the extremity of the lever 95 is a link 120, connecting with a foot pedal lever 121 pivoted on an arm 122 formed with the bracket 85, the pedal lever extending rearwardly alongside the cup to a point conveniently reached by an operator on the seat 40, the purpose of the lever being to afford pressure to the roller 110 when the cup is in engagement with the steps of the inner friction element.

Formed on the back side of the sleeve 75 is a bracket 125 drilled to slidably receive a round bar 126, fixed at its upper end in a lug 127 formed with the jacket 89 near its outer end.

A guide 128, containing an elongated slot 129 receptive of the end of the bar 126, is firmly secured to the frame bar 28 and a collar 130 fixed to the lower end of the bar 126 prevents it from becoming displaced.

In operation, the motor being started and the parts in the positions shown in Figures 1, 2 and 4, obviously power will be transmitted to the drive shaft and the same caused to run at the same speed as the motor, the bevelled edges affording sufficient friction for that purpose.

In order to obtain the second speed, the knob 100 is depressed, raising the catch 104 from the notch 91, the lever 98 being rotated downward sufficiently to clear the projection 111 from the slot 112 of the comb plate, and thus the jacket and its attached part, including the bar 126, sleeve 75, roller 110 and cup moved rearwardly until the projection 111 engages the slot 113, the catch 104 engaging in the center notch 92.

This operation retracts and lowers the cup, causing it to engage the step 60 of the motor driven friction element and upon depressing the pedal 121 a powerful drive is obtained.

The slowest speed is obtained by a similar movement of the same parts, bringing the projection 111 into the slot 114, the catch 104 into the notch 93 and the cup into contact with the step 61.

It is to be noted that a single operating lever only is used and that under the convenient control of the operator who can thus shift the speed in an instantaneous manner at will.

It will also be obvious that the device will operate effectively notwithstanding considerable wear of parts, as such wear is automatically taken up.

It will be understood that changes in the form, arrangement, proportions and minor detail may be made without departing from the spirit of the invention or the scope of the appended claims.

Having thus described my invention and set forth the manner of its construction, application and use, what I claim as new and desire to secure by Letters Patent, is:—

1. In a transmission, the combination with a motor and drive shaft, of a stepped annular friction element fixed on the shaft of said motor, a ring having a bevelled edge resiliently carried at the rear of the larger step of said element, a drum slidably engaged on said drive shaft, said drum having its edge suited to engage said ring and its inner surface to make contact with any of the steps of said friction element, and manual means for shifting said drum definitely to cause engagement either with the ring or any of the steps.

2. In a transmission, the combination with a motor and drive shaft, of a stepped annular friction element fixed on the shaft of said motor, a drum having conical walls open at the outer, larger end slidably engaged on said drive shaft, means permitting said drive shaft to swing in a vertical plane, means for causing contact of said drum with any selected step of the friction element, and an adjustable pressure roller impinging on said drum.

3. In a transmission, the combination with a motor and drive shaft, of a stepped annular friction element fixed on the shaft of said motor, a drum having conical walls open at the outer, larger end slidably engaged on said drive shaft means permitting said drive shaft to swing in a vertical plane, means for manually shifting said drum into definite positions, a pressure roller carried by said shifting means, means for raising and lowering said roller independent of said drum, and pedally operated means for impressing said roller on said drum.

In testimony whereof I have signed my name to this application.

JOSEPH O. MICHAUD.